Sept. 23, 1958 F. G. STENGEL 2,853,408
PROCESS AND APPARATUS FOR TREATING INGOTS
Filed Dec. 21, 1954
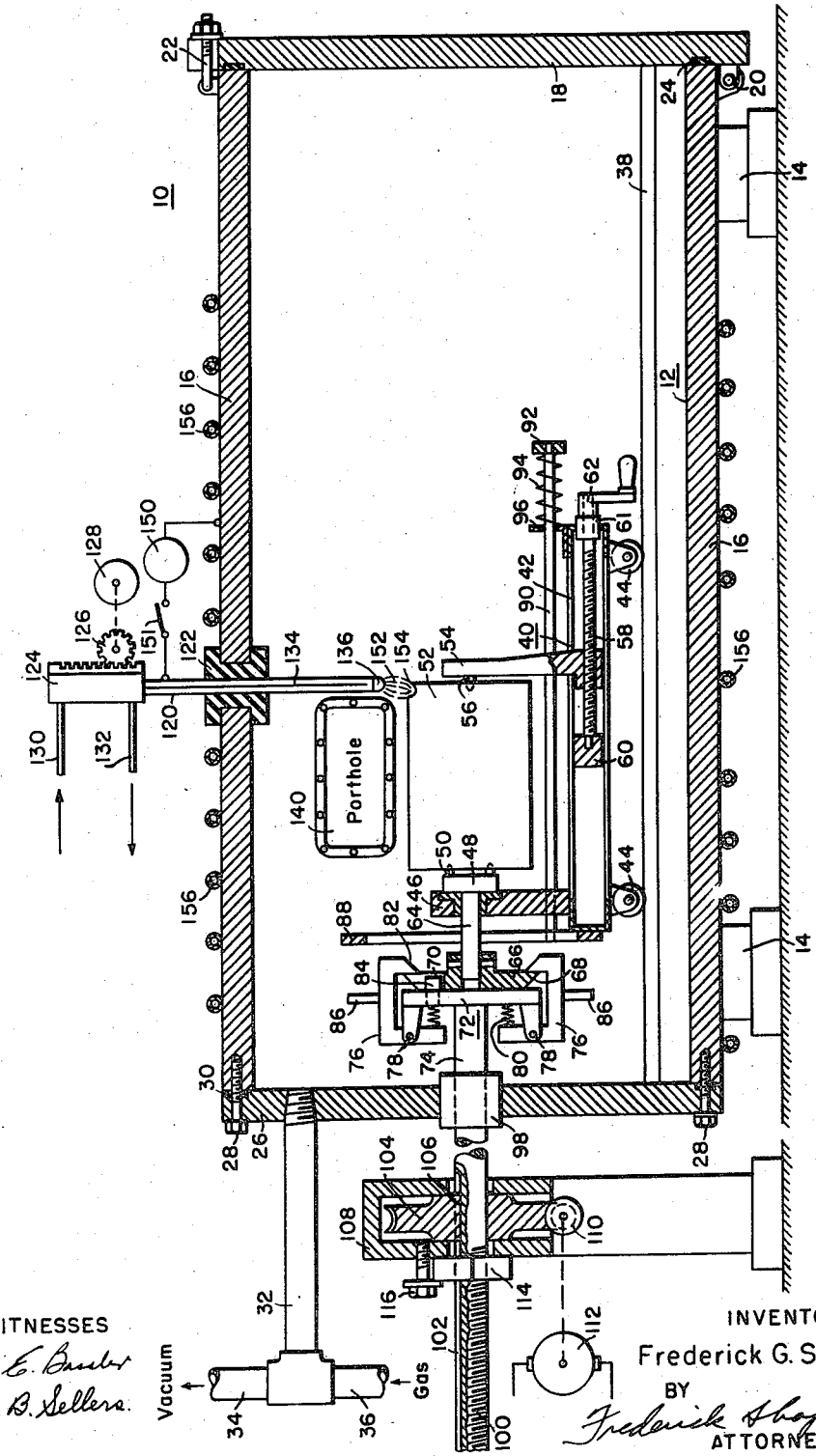
WITNESSES
Edwin E. Baxter
Wm. B. Sellers
INVENTOR
Frederick G. Stengel
BY
Frederick Shapoe
ATTORNEY

United States Patent Office 2,853,408
Patented Sept. 23, 1958

2,853,408
PROCESS AND APPARATUS FOR TREATING INGOTS

Frederick G. Stengel, Pittsburgh, Pa., assignor to Westinghouse Electric Corporation, East Pittsburgh, Pa., a corporation of Pennsylvania Application December 21, 1954, Serial No. 476,621

3 Claims. (Cl. 148—10)

The present invention relates to a process for treating the surfaces of ingots of refractory and highly reactive metals in order to eliminate surface defects therefrom. This disclosure also relates to apparatus for carrying out the process.

While it has been proposed heretofore to treat the surfaces of ingots and billets of metal by melting the surface by means of a gas shielded electrode around which there is a flow of some inert gas, such procedures have proven to be unsatisfactory for a number of reasons. Inasmuch as many of the refractory and highly reactive metals, such as titanium or zirconium, are extremely sensitive to and react with small amounts or low concentrations of oxygen, hydrogen, nitrogen and other gases at elevated temperatures, it is substantially impossible to prevent the surfaces of the ingots from becoming detrimentally contaminated when treating them with gas shielded electrical arcs. The arcs produce a pool of molten metal which solidifies as the arc passes on but the incandescent or hot metal soon is beyond the protective blanket of the gas which shields only a small area about the arc proper, and consequently, the entire metal surface becomes contaminated as soon as it is beyond the shielding gas and comes in contact with the atmosphere. A number of other disadvantages have shown up in practice, and consequently, the conventional practices intended to minimize the surface defects of ingots of refractory and highly reactive metals have not been satisfactory.

The object of this invention is to provide a process wherein an entire ingot having its surface arc melted is maintained within an inert gas.

A further object of the invention is to provide a process for treating the surfaces of refractory and highly reactive metals by surrounding the entire ingot with an inert gas.

Another object of the invention is to provide an apparatus wherein complete ingots of refractory and highly reactive metals are maintained under an inert atmosphere at approximately atmospheric pressure while the surface is subjected to arc melting in order to eliminate any surface defects that may be present.

Other objects of the invention will, in part, be obvious and will, in part, appear hereinafter.

For a better understanding of the nature and objects of the invention, reference should be had to the following detailed description and the single figure of the drawing which comprises a vertical cross section through an apparatus constructed in accordance with the invention.

The present invention is particularly adapted for treating ingots, billets and other massive bodies of refractory and highly reactive metals. This invention is directed particularly to treating ingots of titanium, zirconium, hafnium, uranium, molybdenum and alloys in which these metals comprise the major constituent. Ingots of zirconium and alloys thereof will be particularly referred to hereinafter, but it will be understood that ingots of other metals may be and may have been similarly treated.

In preparing ingots of zirconium, the practice is to prepare compacts by compressing particles of zirconium which result from known processes for producing the free metal from its compounds. These compacts are then subjected to arc melting in a furnace under vacuum or in a protective gas atmosphere. The arc melting has produced ingots weighing up to 1000 pounds and 14 inches in diameter. Ingots of a weight of up to 300 pounds and of a diameter of 12 inches have been readily treated by the process of this invention. Specific reference will be made herein to ingots of zirconium base alloys having a diameter of 4 inches and a length of 6 inches, in describing the process. The surface of the zirconium ingots resulting from the arc melting process may be extremely rough and characterized by pores, scabs, pinholes, and sponginess. The center portion of the ingot is generally of sound quality. If such arc-cast ingots be rolled or forged into bars or other members, the surface defects carry over into the final wrought member. As a consequence, the members will be of low quality with poor physical and other properties. Considerable scrap results. In some cases, it has been proposed to machine the surface of the ingot to a depth of ¼" or more in order to remove these surface flaws. However, the machining operation is costly and results in a considerable amount of scrap which cannot be economically reprocessed. It would be desirable to have available some simple economical process that would result in producing ingots with sound surfaces, such that highest quality structural elements could be produced therefrom.

In accordance with the present invention, it has been discovered that ingots of zirconium may be conveniently and rapidly processed whereby the surfaces are substantially freed from all surface flaws and blemishes to a depth of approximately ¼ inch. Such ingots have been found to produce highly satisfactory wrought members with very little, if any, scrap.

Briefly, the process of the present invention comprises surrounding the entire ingot with an inert gas atmosphere usually introduced originally at subatmospheric pressure and then systematically arc melting the entire surface of the ingot to a depth of approximately ¼" whereby there results a substantially flawless surface.

A suitable apparatus 10 for carrying out the process is illustrated in the figure of the drawing. The apparatus comprises a chamber 12 which includes a cylindrical casing 16 mounted on supports 14. The right-hand end of the casing 16 is closed by a door 18 hinged on a pivot 20 affixed to the lower end of the casing 16. A fastener 22 is provided to clamp the door 18 tightly against the casing 16. An O-ring sealing gasket 24 disposed in a groove in the door 18 is provided to maintain an air-tight seal between the door and the casing 16. The left-hand end of the casing 16 is closed by a closure 26 fastened with a plurality of bolts 28 to the left-hand face of the casing. A sealing gasket 30 is disposed in a groove in the closure 26 provides for an air-tight seal with casing 16. A suitable conduit 32, fitting an opening in closure 26, is connected to an evacuating line 34 leading to a vacuum pump, or the like, and to a gas inlet line 36 for admitting a suitable protective gas, such as helium, argon, or the like, into the chamber 12. It will be appreciated that suitable valves (not shown) are present in lines 34 and 36.

Within the chamber 12 there is disposed a horizontal track or guide means 38 extending the length of the casing 16. A carriage 40 is mounted on the guide means 38 for horizontal movement within the casing 16. The carriage 40 comprises a chassis 42 having wheels engaging with the guide means 38. Extending upwardly from the left-hand end of the chassis 42 is a fixed bracket 46 in which there is rotatably mounted a support 48 provided with prongs 50 adapted to engage a cylindrical ingot 52 whose surface is to be treated. It will be appreciated that the prongs 50 fit into previously prepared mating apertures in the end of the ingot 52 such that the axis of the ingot is substantially coincident with the axis of the support 48. At the right-hand end of the carriage 40 is located a horizontally movable bracket 54 having a coned pivot 56 fitting into an aperture substantially at the longitudinal axis of the ingot 52, whereby the ingot 52 may rotate on the pivot 56. A worm 58 is threadedly engaged with the base of the bracket 54 in order to move it into and out of engagement with the ingot. One end of the worm 58 rotates in a fixed bearing 60, while the other end passes through a supporting bearing 61 and is connected to a crank 62 which enables the worm 58 to be manually rotated.

The support 48 is fixed to a short shaft 64 passing through a bearing in the vertical bracket 46 and extending slightly beyond it. The extremity of the shaft 64 is connected to a disk 66 whose outer periphery is provided with a coned surface 68 and a radial slot 70. By movement of the carriage 40, the disk 64 may be brought into juxtaposition to an engaging member 72 affixed to a drive shaft 74. The engaging member 72 comprises a plurality of dogs 76 pivoted at 78 and engaging with springs 80 tending to move the dogs into a position that they may clamp over the disk 66. The dogs comprise sloped fingers 82 adapted to coact with the coned surface 68 to spread them out thereby to permit the disk 66 to slip between them until the disk comes into contact with the member 72 at which time the dogs will slip over the edge of the disk 66 and hold it fast. A pin 84 is provided on member 72 to fit within slot 70, thereby to rotate the disk 66 in accordance with rotary movement of the member 72.

In order to disengage the dogs 76 from the disk 66, there are provided release fingers 86 on each of the dogs. These fingers are arranged to be contacted by a ring 88 carried by a rod 90. As will be seen in the drawing, the extreme right-hand end of the rod 90 is connected to a push bar 92. A compression spring 94 disposed between a fixed flange 96 on the chassis 42 normally tends to maintain the push bar 92 in an extreme right-hand position. However, on exerting a pressure on the push bar 92 by hand, for example, the ring 88 will be moved to the left of bracket 46 where it will engage the fingers 86 on each of the dogs and thereby cause the dogs to pivot to an open position where the disk 66 can be withdrawn.

The shaft 74 passes through a gas-tight stuffing box 98 equipped with double O-ring seals, for example, in the closure 26 to the exterior of the chamber 12. Externally, the shaft 74 comprises a threaded section 100 provided with a slot 102 passing through a worm gear 104 having an engaging spline 106 slidably movable within the slot 102. The worm gear 104 simply rotates the shaft 74, the shaft being free to slide with respect to the worm gear. The worm gear 104 is disposed within a housing 108 which contains a driving worm 110 engaging gear 104, which worm is rotated by a suitable motor 112 whose speed and direction of rotation can be controlled. At the exterior of the housing 108, there is disposed a nut 114 which is threadedly engaged with the threads on section 100 on shaft 74. The nut 114 may be clamped for non-rotating movement by a bolt 116. When the bolt 116 is loosened, nut 114 is free on shaft 74, and the shaft 74 will be rotated by the worm gear 104 without advancing in either direction. By clamping the nut 114 to the housing 108, rotation of the shaft 74 by worm gear 104 causes horizontal movement of the shaft.

There is disposed a vertically extending movable electrode 120 passing through the walls of casing 16 through an insulating and gas-tight gland 122. The gland 122 may comprise a block of polytetrafluoroethylene resin, or other insulating material provided with suitable seals. The electrode 120 has a rack 124 affixed to the upper end engaging with a pinion 126 which may be manually operated through a handwheel 128 to raise or lower the electrode 120. A cooling water inlet tube 130 and outlet tube 132 are connected to the electrode 120 which is hollow to enable water to pass through the interior down one side of an internal barrier 134 which terminates short of the end, and up the other side to the outlet 132. A tip 136 is provided at the bottom end of the electrode. Such tip comprises tungsten or other suitable refractory metal.

In the walls of the casing 16, there is provided a window 140 forming a porthole through which operations within the interior of the chamber 12 may be observed.

In carrying out the process, the door 18 is loosened from the fastener 22 and pivoted downwardly. The carriage 40 is then moved to the right-hand end of the casing 16, or even removed from the chamber 12, and a zirconium ingot 52 in the form of a circular cylinder whose cylindrical surface is to be arc melted is then placed so that previously prepared apertures in one end fit the prongs 50, and a central aperture at the other end fits upon the coned pivot 56. The crank 62 is manipulated to bring the support 54 along with the pivot 56 into a position to hold the ingot snugly between the prongs 50 and the pivot 56. Thereafter, the entire carriage is moved to the left along the track or guide means 38 until the coned surface 68 of disk 66 engages the surfaces 82 of the dogs 76 and forces them outwardly and passes under them at which time the dogs will be forced by the springs 80 to clamp over the edges of the disk 66, and the pin 84 is engaged in slot 70. The door 18 is then closed and fastened. The entire chamber will be evacuated through line 34 to remove all gases therefrom, purged with helium and re-evacuated. Thereafter, helium gas is admitted through line 36 into the chamber 12 until a pressure of the order of 10 to 12 pounds per square inch absolute pressure is present in chamber 12. Thereafter, the handwheel 128 is turned to cause the electrode 120 to lower to a position where the tip 136 is a slight distance above the upper surface near the right end of the ingot 52 and substantially directly above the longitudinal axis of the ingot 52. Water is now introduced from the inlet 130 through the electrode 120 to keep it cool during subsequent use. Thereafter, an electrical current from a suitable source 150 is passed to the electrode 120 by closing switch 151, and an arc 152 is drawn between the tip of the electrode and the surface of the ingot. The arc soon produces a molten pool 154 of zirconium of a depth of approximately ¼ inch. As soon as an arc has been properly established and the molten pool of metal has been produced, the motor 112 is put into operation to rotate the worm gear 104. The nut 114 is clamped to cause horizontal movement of the shaft 102 to the right as it rotates. The shaft will turn the support 48 through the clutch member 72 and disk 66 to rotate the ingot 52. As the shaft 74 revolves, it will move carriage 40 and ingot 52 to the right.

For best ingot conditioning, I have discovered that the arc 152 should produce a molten pool 154 of zirconium of a depth of approximately ¼ inch. For an electrode tip of a diameter of ⅜ of an inch, the pool 154 will be of a width of approximately ½ inch. Due to the simultaneous rotation of the ingot and horizontal movement of the ingot in its carriage 40, the molten pool will follow a helical or spiral path along the surface of the ingot 52. It is understood that each helical turn of the molten pool overlaps the previous molten and solidified spiral. In practice, good results have been secured with a rate of horizontal movement of the entire carriage 40 to the rotation of the ingot to produce three helical spirals per inch of the longitudinal length of the ingot.

The electrical current supplied to the electrode 120 may be from 100 to 300 amperes at 17 to 18 volts for treating zirconium ingots. It is usually desirable to apply current at 100 to 150 amperes for the first turn or so of the ingot and then to increase the current density to 250 to 275 amperes for treating the rest of the ingot, reducing the current, however, to 100 to 125 amperes for the last turn or so. The travel of the surface with respect to the electrode is from 3 to 12 inches a minute.

In practice, I have melted the entire cylindrical surface of zirconium ingots of a diameter of 4 inches and a length of 6 inches in one-half hour. During this treatment, the ingot revolved approximately eighteen times. The arc traveled at a speed of approximately 7 inches a minute.

As the arc-melting treatment progresses, the entire ingot may become quite hot, and quite often nearly all the surface will be red hot at the end of the arc melting process. Consequently, it is desirable to permit the ingot to remain within the chamber 12 for a period of time until its temperature drops below the point at which undesirable reaction or contamination of the surface with atmospheric gases may take place. Since large quantities of heat are evolved, the surface of casing 16 is covered with a network of cooling coils 156 carrying a flow of cooling water in order to absorb the heat. The heating increases the pressure of the gas atmosphere such that it will rise to a pressure slightly above atmosphere.

The treatment of the surface of the ingot, as disclosed herein, has been found to eliminate surface roughness, sponginess, porosity, scabs and other flaws. The surface will have a smooth, fused appearance with slight ridges indicating the helical arc melting path. Such processed ingots have been forged and rolled with success, little or no scrap being produced, and the highest quality of product resulted therefrom.

It is feasible to rotate the ingot manually, eliminating the gear 104, by means of a hand crank attached to shaft 74, the operator observing the arc 152 through the window 140 and thereby controlling its path. Furthermore, the ingot may be reciprocated horizontally so that the molten pool of metal 154 proceeds in a path from one end to the other end of the ingot, and then the ingot is indexed to rotate the surface approximately ⅓ of an inch, and the molten pool is traversed backwards, and so on until the ingot surface is all melted.

The process of the present invention is particularly advantageous for treating ingots because of the small amount of protective gas necessary as compared to any prior art process for treating easily oxidizable metals. Only a few cubic feet of helium gas are necessary to fill the chamber 12. Prior art processes using shielded arc electrodes employ a far greater amount of gas for treating the same amount of surface and the gas protects only a small area of the surface ingot. Consequently, such prior art processes are ineffective to protect hot ingot surfaces only a short distance away from the arc.

A further advantage of the invention is the fact that the apparatus may be put into operation, and it will function satisfactorily with a minimum of attention and supervision.

It will be understood that the above description and drawing are exemplary and not exhaustive.

I claim as my invention:

1. In the process of improving the surface of a cylindrical metal ingot of a refractory and extremely reactive metal from the group consisting of titanium, zirconium, uranium, hafnium, and molybdenum and base alloys thereof, the ingot being of substantially circular cross section, the steps comprising mounting the ingot in a hermetic enclosure with the ingot axis being horizontal for rotational movement, completely surrounding the ingot with an inert gaseous atmosphere at subatmospheric pressure, placing a non-consumable electrode at a point adjacent one edge of the ingot at a point vertically above the axis at an upper horizontal portion of the cylindrical surface of the ingot, passing an electrical current of from about 100 to 300 amperes between the electrode and the ingot to arc melt the surface of the ingot at that point to produce a pool of molten metal to a depth of approximately ¼ inch, and rotating the ingot at a surface speed of 3 to 12 inches per minute so that the arc will melt successive portions of the surface, and simultaneously with said rotation, slowly moving the ingot along its horizontal axis so that the path of the molten pool will form a helical spiral along the cylindrical surface of the metal ingot, the turns of the spiral overlapping slightly whereby the entire cylindrical surface of the ingot is so melted thereby eliminating the roughness, porosity, gas-pockets and other flaws from the treated surfaces and maintaining the inert gaseous atmosphere about the ingot until the temperature of the surface is below that at which the metal is reactive with the atmosphere.

2. In the process for improving the surface of a metal ingot of a refractory and extremely reactive metal from the group consisting of titanium, zirconium, uranium, hafnium and molybdenum, and base alloys thereof, the steps comprising disposing the ingot in a hermetic enclosure and surrounding the entire metal ingot with an inert atmosphere at subatmospheric pressure, the atmosphere comprising a gas selected from the group consisting of argon and helium, placing a non-consumable electrode adjacent a point on an upper horizontal portion of the surface of the ingot, passing an electrical current of from 100 to 300 amperes between the electrode and the ingot to arc melt the surface of the ingot at the point to produce a pool of molten metal to a depth of approximately ¼ inch, and moving the metal ingot relative to the electrode so as to dispose successive adjacent portions of the ingot surface in a substantially horizontal plane immediately adjacent the electrode whereby the pool of molten metal moves along selected portions of the ingot surface and all of such selected portions of the surface have been subjected to melting thereby eliminating the roughness, porosity, gas-pockets and other superficial flaws from the surface portions so treated, the inert atmosphere being maintained about the ingot until it has cooled to a temperature at which it is not reactive with the atmosphere.

3. An apparatus for arc melting a metal ingot having a cylindrical surface in order to reduce the surface roughness, porosity, gas-pockets and other flaws, in combination, a sealable chamber, means for evacuating gases from the chamber and to introduce selected gases thereto, a horizontal guide means disposed in the chamber, an ingot-supporting carriage disposed on the guide means for horizontal linear movement thereon, the carriage including ingot mounting means comprising a shaft provided with a disc enabling the ingot to rotate about its cylindrical axis, means connectible with the mounting means on the carriage for reciprocating the carriage along the guide means and for actuating the ingot mounting means to rotate the ingot, the connectible means comprising a plurality of pivoted dogs capable of engaging the disc, a pin and slot means on the disc and the connectible means to enable the connectible means to rotate the disc and the shaft, and a release means to pivot the dogs to disengage them from the disc, a cooled non-consumable electrode movably mounted with respect to the walls of the chamber, and means for moving the electrode to a position adjacent an ingot mounted on the carriage.

References Cited in the file of this patent

UNITED STATES PATENTS

| | | |
|---|---|---|
| 1,064,671 | Simpson | June 10, 1913 |
| 2,125,172 | Kinzel | July 26, 1938 |
| 2,175,607 | Kinkead | Oct. 10, 1939 |
| 2,640,792 | Binder | June 2, 1953 |
| 2,654,821 | Gillett | Oct. 6, 1953 |

OTHER REFERENCES

Journal of Metals, March 1952, pages 304–306.